Aug. 25, 1964     R. W. BALDWIN     3,146,210
PREPARATION OF CATALYST PELLETS HAVING SUSTAINED
HARDNESS AND ATTRITION RESISTANCE
Filed May 17, 1960
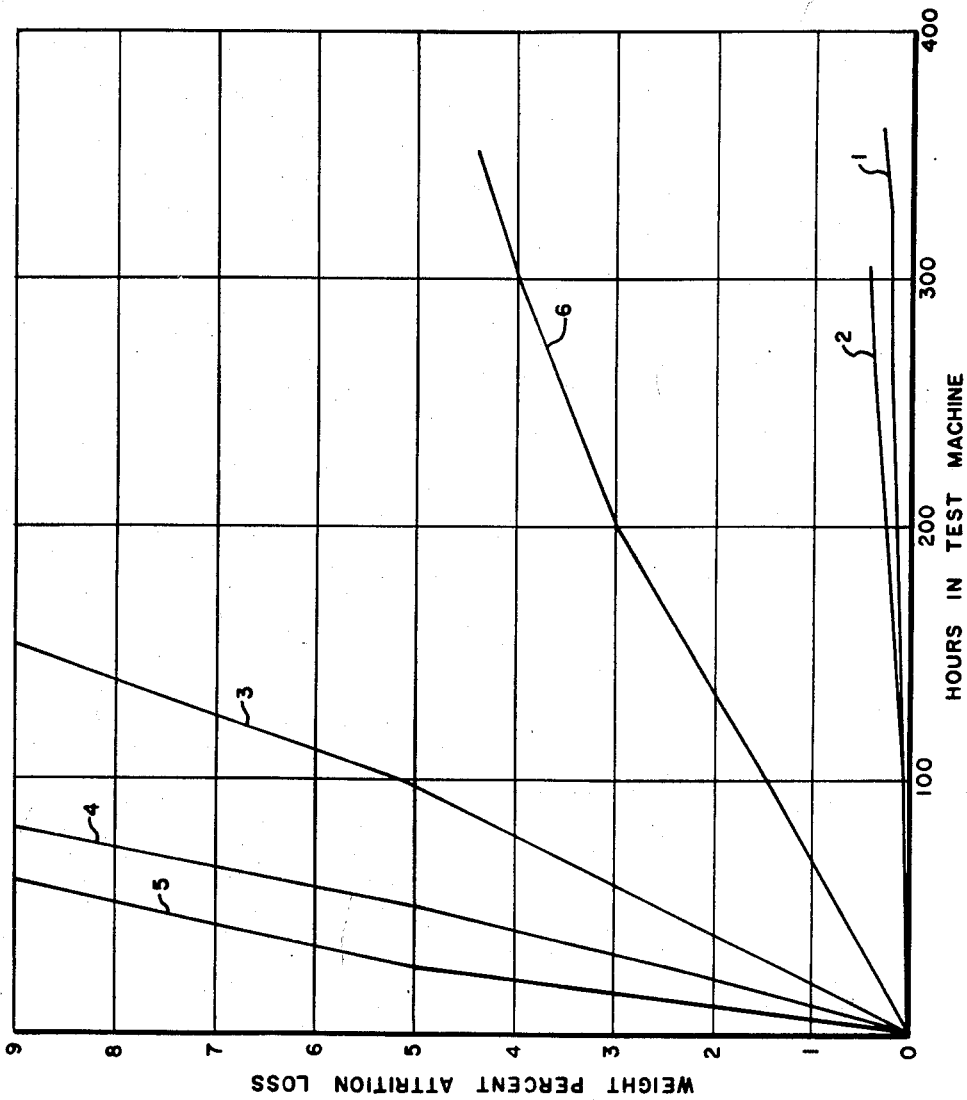
*INVENTOR.*
RALPH W. BALDWIN
BY
ATTORNEY

United States Patent Office 3,146,210
Patented Aug. 25, 1964

3,146,210
PREPARATION OF CATALYST PELLETS HAVING SUSTAINED HARDNESS AND ATTRITION RESISTANCE
Ralph W. Baldwin, Upton, Mass., assignor to Oxy-Catalyst, Inc., Berwyn, Pa., a corporation of Pennsylvania
Filed May 17, 1960, Ser. No. 29,722
8 Claims. (Cl. 252—455)

This invention relates to the production of molded pellets of activated alumina and of similar activated oxides of superior physical properties, particularly when used at high temperatures.

The use of pellets of certain inorganic oxides in their so-called catalytically active or adsorptive form, such as pellets of catalytically active forms of alumina, beryllia, or zirconia, as catalysts, catalyst carriers, adsorbents, etc., is well known. Thus for example, pellets of catalytically active alumina or beryllia impregnated with various metals such as platinum, ruthenium, palladium, nickel, copper, cobalt, chromium or mixtures of these metals or their oxides are useful for carrying out many types of reactions such as oxidation, hydrogenation, desulphurization, hydrocarbon reforming reactions, as well as many others.

In many applications of pellets composed of these materials, their physical properties, particularly their hardness and resistance to attrition, is of great importance. In some cases for example, a bed of such pellets may be subjected to constant movement, causing constant impacts and rubbing of the pellets against one another and against the walls of the container. This is true, for example, in the so-called moving bed operations, common in the petroleum refining industry where the pellets are constantly moved through various zones where operations of different types are carried out. In this type of application the pellets must also be able to withstand rather large compression loads which result from the use of catalyst beds of substantial depth. Another example of an application where the resistance of the pellet to mechanical attrition is of prime importance is in the use of pellet type oxidation catalyst for the elimination of obnoxious fumes given off by internal combustion engines during operation. Where a catalytic exhaust purifier is installed on a vehicle the catalytic pellets, which for example may be pellets of catalytic alumina impregnated with metal such as platinum, silver, or the like, are subjected to constant vibration and mechanical shock due to engine vibration and that incident to the movement of the vehicle over the road.

In addition to the rough mechanical treatment to which such pellets are often subjected, in some applications, the pellets may be subjected to relatively high temperatures, such as temperatures of 1200° F. and as high in some cases as 2000° F. Temperatures of this order of magnitude are encountered frequently for example when pellets of this type, such as pellets of catalytic alumina impregnated with platinum, are employed as oxidation catalysts. In the use of such materials in catalytic mufflers, for example, temperatures in the catalyst bed ranging as high as 1200° F. to 1500° F. and even upwards of 1800° F. may be encountered.

It has been found that the effect of such elevated temperatures upon the physical properties of pellets of activated alumina and similar materials is quite deleterious. While such pellets may be capable of retaining their original hardness and attrition resistance for long periods when used at relatively low temperatures, when employed at high temperatures, become soft and easily disintegrate. The effect of the temperature may become appreciable even at temperatures of 1000° F. and becomes much more series at temperatures of 1300° F. and higher.

It is accordingly an object of the present invention to provide a method for producing hard, attrition resistant pellets of activated alumina or similar oxides in activated form, which will retain these desirable physical properties, when exposed to relatively high temperatures of operation.

It is a further object of the invention to produce such temperature resistant pellets without decreasing the catalytic properties of the material. It is a specific object of the invention to provide a method for producing temperature resistant pellets of activated alumina and similar activated oxides to form suitable carriers for metal such as platinum, palladium, silver, copper, etc., so as to provide oxidation catalysts of high activity and outstanding physical properties suitable for operation over wide ranges of temperature.

According to the invention, pellets of activated alumina and of similar oxides in activated form, of excellent physical properties, and capable of retaining these properties in usage at relatively high temperatures, are produced by forming a mixture of (a) the oxide in finely divided condition, and in an at least potentially active but non-gelatinous form; (b) a minor proportion of colloidal silica; (c) a minor proportion of a metal salt decomposable into alumina or a similar oxide; shaping this mixture into pellets, and thereafter heating the pellets to react the metal salt with the silica to form a metal silicate binder and decompose any excess metal salt to its oxide. It is important that the silica be in colloidal form since it has been found that when in this form as against a less finely subdivided form or a gel the silica reacts with the metal salt for example aluminum nitrate, to form a metal silicate binder, for example aluminum silicate, deep in the pores of the alumina or other oxide selected.

Activated oxides with which the invention is concerned, generally speaking, include those of the class typified by activated alumina which are difficulty reducible (that is, which are not reduced in a stream of hydrogen at temperatures of the order of 500° F.); which may be prepared in the form of gelatinous hydrated oxides; and which are produced in activated or catalytically active form by dehydration of the hydrated oxide under controlled conditions to form structures of large internal pore volume and surface area. Oxides of this class, in addition to activated alumina, with which the invention is concerned, include in particular, activated beryllia, zirconia, thoria, silica and magnesia including combinations and composites of these with themselves and with alumina, such as alumina-beryllia, alumina-zirconia, and alumina-thoria composites. The invention is particularly concerned with the production of pellets composed of catalytically active alumina or of composites of catalytically active alumina with active forms of other oxides in the above group.

It is, of course, well known in the art that only certain forms of this class of inorganic oxides are catalytically active. The catalytically active, or so-called activated or adsorptive forms of these oxides are characterized by a structure which possesses a large internal pore volume and surface area contributed by extremely minute internal pores and fissures, and are prepared in this form by controlled dehydration of a hydrated form of the oxide, control of temperature during such dehydration being essential to prevent destruction of the porous structure. In the case of alumina, for example, certain forms such as the so-called alpha alumina, also frequently referred to as corundum or alundum, possess substantially no catalytic properties, being characterized by a relatively dense structure having little or no internal pore volume or surface area. Catalytically active alumina, on the other hand, may be prepared by precipitating a hydrous alumina gel from a solution of an aluminum salt, drying the gel and thereafter heating carefully at a temperature no higher than about 2000° F. to expel the hydrated water and produce a partially anhydrous or substantially anhydrous oxide which is often referred to as gamma alumina. Catalytically active alumina may also be prepared from the naturally occurring bauxite, which contains hydrated alumina, by removal of the impurities which it contains such as iron and silicates, followed by heating at a temperature below 2000° F. to drive off the hydrated water. This heating procedure at a controlled temperature to drive off hydrated water is commonly termed activation or calcination. The completely hydrated form of these oxides possesses substantially no catalytic activity although it is said to be potentially active since it may be rendered catalytically active by calcination to provide the anhydrous or partially anhydrous form.

The degree of purity required in these oxides for catalytic use depends somewhat upon the particular type of catalyst or adsorbent to be prepared and the conditions under which it is to be used. Generally speaking, however, in the production of good quality catalysts, the oxide should be of high purity preferably containing no more than fractional percentages of materials such as iron and sodium which often tend to decrease the activity.

As stated above, in preparing pellets in accordance with the invention, the oxide, such as alumina, should be mixed with the other constituents, namely colloidal silica and the decomposable metal salt, in a finely divided condition and in at least potentially active but non-gelatinous form. Thus, the pellet forming mixture may contain a fully hydrated form of the oxide, such as alumina trihydrate, which is potentially active, that is capable of being rendered catalytically active by calcination, and may also contain the oxide in its partially or completely activated form, such as a partially or almost completely anhydrous alumina prepared by controlled calcination of the hydrated form. The oxide, however, as present in the mixture, should be non-gelatinous in character, that is the original gel, in cases where the oxide is prepared by precipitation should be evaporated substantially to dryness, thus removing substantially all of the loosely bound water present in the original gel. Thus in the preparation of alumina from a solution of aluminum nitrate, a gelatinous hydrated oxide may be produced by precipitation through the addition of ammonium hydroxide to the aluminum nitrate solution. The gelatinous precipitate thus produced containing large amounts of loosely bound water of gelation, should be evaporated at least substantially to dryness thus producing a hydrated but non-gelatinous form such as alumina trihydrate.

Preferably, the mixture from which the pellets are formed contains the oxide in an at least partially activated condition, that is, in a condition resulting from the removal of at least a portion of the chemically combined water. Thus, in the case of alumina, best results are generally obtained when the alumina particles in the mixture contain less than about 20% of chemically combined water as the result of at least partial calcination of the fully hydrated form which contains about 35% by weight of chemically combined water.

The degree of fineness of the oxide in the mixture has an important effect upon the quality of the pellets produced. While according to the more general aspects of the invention, it may be in the form of a relatively fine powder, such as one passing a 100 to 325 mesh screen, according to a preferred and particularly advantageous embodiment of the invention, the oxide should be present in the mixture in an extremely fine condition in which a substantial proportion of the material has been reduced to particles below 1 micron in size. Thus, it is preferred to subject the oxide to a reduction operation, such as repeated colloid milling, until substantially 100% by weight of the material has been reduced to particles of less than 40 microns in size and the specific surface of the material is of the order of at least 60,000 cm.$^2$/cm.$^3$ (specific surface determined in the manner hereinafter specified).

The second component of the mixture, namely colloidal silica, is preferably added as an aqueous suspension. The avarge size of the silica particles in the suspension or sol should lie in the range of from about 2 to 100 millimicrons and preferably the size of the silica particles should lie in the lower portion of this range, namely in the range between about 2 and 50 millimicrons. Particularly preferred are silica suspensions or sols made according to the processes described in U.S. Patent 2,574,902 to Bechtold and Snyder or in U. S. Patent 2,577,485 to Rule. According to the processes described in these patents, stable silica sols containing upwards of 50% by weight of silica are prepared by heating an ordinary silica sol containing particles less than 10 microns in diameter to form a so-called "heel," and then building up the particle size of the silica in the "heel" by adding further quantities of the small particle size sol with continued heating. Silica suspensions made according to the processes of these patents are characterized by contianing relatively dense, substantially spherical particles of amorphous silica in a particle range of from about 10 to 130 millimicrons; by relatively high silica:alkali ratios of the order of 60:1 to 500:1. Preferred for use in the invention are sols of this type in which the silica has an average particle size ranging from about 10 millicrons to 60 millimicrons in diameter.

The amount of silica incorporated in the finished pellet should be minor relative to the weight of the activated oxide, and should generally range from .5% to 20%, and preferably from 2% to 8% by weight based on the weight of the finished pellet. The optimum weight percentage of silica to be chosen within these general limits depends upon the particular use for which the pellets are intended. In the production of oxidation catalysts, for example, where a material such as activated alumina or beryllia is impregnated with a small amount of metal such as platinum, the amount of silica incorporated should be such as not to materially affect the oxidation activity of the finished catalyst. In this connection, it has been found that silica suspensions of the type discussed above are particularly desirable in that they produce the desired hardening effect with a minimum effect on oxidation activity.

The third component of the pellet forming mixture bf the invention, namely a metal salt decomposable into one of the oxides with which the invention is concerned, should be a salt which possesses relatively good water solubility and of a type which decomposes relatively easily by heat. Water soluble slats of aluminum and strong acids, such as aluminum chloride, aluminum sulphate, and especially aluminum nitrate, are particularly desirable for this purpose. Water soluble salts, particularly those of strong acids, decomposable into beryllia, thoria, zirconia, or magnesia, though not as generally desirable as aluminum salt for this puropse, may also be used in some cases. The nitrates of the metals mentioned generally give the best results, having good water solubility and decomposing relatively easily by heat at relatively low temperatures.

The optimum amount of aluminum nitrate or other similar compound to be incorporated in the mixture is best determined by experiment. Generally speaking, the water solubility of the salt will limit the amount that can be added. No more of the salt should be added than will remain in solution when the mixture is adjusted in moisture content down to the desired molding consistency. Formation of crystals in the mixture to be molded will interfere with the molding operation.

The three components of the pellet forming mixture should be intimately intermixed before formation of the pellets. This can be conveniently accomplished by mixing them in an aqueous slurry which is sufficiently non-viscous to permit the ingredients to intimately intermix and to permit complete solution of the dissolved salt. Satisfactory results will generally be obtained for example by introducing the salt into a water slurry of the finely-divided oxide, containing for example 50% by weight of solids, stirring the mixture until the salt is completely dissolved, and then adding an aqueous suspension of colloidal silica with continued stirring.

After thus obtaining a homogeneous mixture, the water content of the mixture is then reduced to provide a mixture of the proper consistency for the shaping operation. Where it is desired to extrusion-mold the mixture into pellets, in accordance with the preferred embodiment of the invention, it is preferable that the mixture be brought to the consistency of a dry dough in preparation for extrusion. The optimum moisture content to produce a mass of optimum extrudability and for the production of a pellet of the best physical characteristics will vary somewhat depending upon the particular oxide. In general, however, it may be stated that the dough for extrusion will generally have a moisture content ranging from about 15% to 35% by weight (moisture determined by exaporation to constant weight at a temperature of the order of 250° F.). To obtain hard, dense pellets, the dough should extrude under considerable pressure, pressures of at least 150 lbs. per square inch and preferably considerably higher, for example of the order of 500 to 3000 lbs. per square inch being desirable. One of the most convenient methods for determining the proper moisture content of the dough in any particular case is to empirically adjust the moisture until the desired extrusion pressure is obtained. The lower the moisture content, in general, the higher is the required extrusion pressure. When other molding or shaping methods are employed, the optimum moisture content of the mixture to be shaped may vary from the ranges discussed above in connection with extrusion molding.

After molding, the moist pellets must be dried to remove free moisture and then heat treated to decompose the incorporated salt. Generally speaking, best results are obtained by drying to remove free moisture relatively slowly and at a relatively low temperature and afterwards raising the temperature to that necessary to decompose the incorporated salt into its corresponding oxide. Thus, maximum drying temperatures to remove free moisture of about from 200° F. to 220° F. are preferable, while temperatures of from about 400° F. to 1500° F. are those generally necessary for the decomposition of the incorporated metal salt. Often, the quality of the pellets will be improved by final heat treatment for several hours at a temperature of for example from about 500° F. to 1500° F.

*Example I*

A slurry of finely divided alumina in water was prepared in the following manner. The starting alumina was a catalytic grade alumina in the form of a free flowing powder having the following sieve analysis: 100% passing 150-mesh; 50% to 60% retained on 300-mesh; 40% to 50% passing 300-mesh; and had the following chemical analysis:

| | |
|---|---|
| $Al_2O_3$ | 90.2%. |
| $Na_2O$ | 0.43%. |
| $Fe_2O_3$ | Less than 0.36%. |
| $SiO_2$ | Less than 0.18%. |
| Combined $H_2O$ | 9.1%. |

This powder was mixed with water in the proportion of 5 kilograms of the powder in sufficient water to give 8 litres of slurry. This slurry was passed repeatedly through a colloid mill, being careful to maintain uniformity of the slurry by agitation. The colloid mill employed was manufactured by the Troy Engine & Machine Company, of Troy, Pennsylvania, and consisted of a rotating disc and a stationary disc which may be metal or ceramic faced, with means for adjusting the clearance between these discs, and thus adjusting the intensity of the reduction action. The rotating disc revolves at a speed of 20,000 r.p.m. while the slurry is pumped between it and the stator.

The original mixture was passed through this mill a total of eight times. During the first pass the clearance between the stator and the roller was adjusted to about .005″. During the succeeding passes this clearance was reduced to zero clearance and below, that is, the discs were pressed toward one another with considerable force so that in the absence of the film of slurry pumped between them, which acts as a lubricant, they would be directly in contact. The action produced by the mill operated in this manner is believed to be a combination of hydraulic shear and attrition caused by inter-particle attrition and direct attrition between the surfaces of the discs. This latter attrition action is evidenced by the fact that the surface of the discs tend to show progressive wear.

During the first five passes through the mill, the viscosity of the slurry did not change significantly; on the sixth pass a distinct increase in viscosity was noted, the slurry having the pour characteristics of a thick syrup. On the seventh and eighth passes the viscosity increased still further and acquired a smooth, semi-self-sustaining consistency similar to the consistency of plaster when mixed with the proper amount of water for troweling.

As the particle reduction proceeded, the tendency toward phase separation progressively decreased, until the samples obtained from the last two or three passes through the mill, containing approximately 50% by weight of water (solids content determined by evaporating the water slurry at a temperature of the order of 200° F. to 250° F.) very little phase separation occurred even after prolonged standing. Samples of the earlier passes when set aside settled rather rapidly into a supernatant water phase with a lower, solids-containing phase. The particle size distribution in the final material, which was subjected to eight passes through the mill as described above, was determined by a combination of two methods, one employing the sedimentation technique, and the other employing electron microscope examination. The distribution in the particle range of 2 microns and above was determined by the sedimentation technique, using the Bouyoucas hydrometer method which is based upon Stokes law for the settling rate of particles suspended in a fluid. A typical procedure using this method is described in ASTM Standard (1952), Part 3, published by American Society for Testing Materials, pages 1420 to 1430 (ASTM designation: D422–51). Particle size distribution in particle range below 2 microns was determined by electron microscope examination at magnifications of 10,470× and 32,500×. Combination of the results of the data obtained by these two methods shows the following particle size distribution for the finely divided alumina thus obtained.

| Particle size in microns: | Weight percent finer than |
|---|---|
| 15 | 100 |
| 10 | 95 |
| 8 | 90 |
| 5 | 82 |
| 3 | 73 |
| 2 | 65 |
| 1 | 45 |
| 0.8 | 36 |
| 0.6 | 25 |
| 0.4 | 14 |
| 0.2 | 4 |
| 0.1 | 1.5 |

From the particle size distribution curve corresponding to the data in the above table, the specific surface of the reduced alumina, as expressed in square centimeters of particle surface per cubic centimeter of volume was determined by stepwise graphical integration using the relation:

$$\text{Specific surface } (cm.^2/cm.^3) = \frac{60,000}{D_t}$$

where $D_t$ is apparent particle size in microns as indicated on the particle size distribution curve. Using this method, the specific surface of the reduced alumina was found to be about 82,000 cm.$^2$/cm.$^3$.

The water slurry of alumina particles after eight passes through the colloid mill, and in such degree of fineness, was then mixed with aluminum nitrate added in the form of aluminum nitrate crystals (Al(NO$_3$)$_3$.9H$_2$O) in the proportion of 10 grams of Al(NO$_3$)$_3$.9H$_2$O crystals per 100 grams of alumina-water slurry (45% by weight of alumina). This mixture was thoroughly stirred until the aluminum nitrate crystals were completely dissolved.

To this water slurry of alumina particles containing dissolved aluminum nitrate, there was added an aqueous suspension of colloidal silica particles prepared according to the processes described in the above mentioned United States Patents 2,574,902 and 2,577,485. The particular suspension employed was commercially available material sold by the Du Pont de Nemours Company under the name "Ludox," containing about 30% by weight of SiO$_2$, having a specific gravity of about 1.28, and having a SiO$_2$—Na$_2$O mole ratio of about 90. The silica particles in this suspension are substantially discrete spheres of dense, amorphous silica having an average diameter of about 17 millimicrons, and remarkably uniform in size. This suspension of colloidal silica was added in the proportion of 10 cubic centimeters of the silica suspension per 100 grams of the original alumina-water slurry (before addition of the aluminum nitrate). The addition was made over a period of about a half-hour with constant stirring.

The resulting mixture was then transferred to a mixing device where it was stirred constantly while a stream of hot air was blown over the surface causing evaporation of the water contained in the slurry until reduced to the consistency of a dry dough, corresponding to a dry solids content of about 75% to 80% by weight. This dough was then transferred to a hydraulic press from which it was extruded through an extrusion die having an orifice of ⅛" in diameter under an extrusion pressure of 500–700 lbs./sq. in. hydraulically impressed on a 1" diameter plunger. The extrudate from the round hole die was cut into short lengths of about ⅛" to make cylindrical pellets. These pellets were thereafter dried at room temperature and at 250° F. and then were treated at a temperature of about 500° F. for several hours to effect decomposition of the aluminum nitrate into alumina.

One sample of these pellets was then placed in a Lindbergh electric oven and exposed to a temperature of 1300° F. for one hour. A second sample was similarly heat treated at a temperature of 2000° F. for two hours. Hardness tests were made on the thus treated pellets using an apparatus consisting of a knife blade hinged at one end with a spring tension force scale attached to the other end. The pellet is supported on a plate near the middle of the length of the blade and tested by measuring the force required to cut it diametrically, the cutting force being measured in pounds on the spring tension scale attached to the end of the blade. From 5 to 10 pellets of each sample were tested and the force readings averaged for each sample. Tested in this manner, the pellets which were heat treated at 1300° F. showed a knife hardness of 4.6 lbs., while those heat treated at 2000° F., showed approximately the same knife hardness.

*Example II*

Example I was repeated with the exception that approximately half the amount of silica was employed in this case, the ingredients being mixed in the following proportions:

Alumina-water slurry (45% by weight of solids) _____ grams__ 100
Al(NO$_3$)$_3$.9H$_2$O crystals _____do____ 10
Colloidal silica suspension (30% by weight SiO$_2$) _____cc__ 5

The resulting pellets contained about 3.9% SiO$_2$ by weight. As in the previous sample, one portion of the pellets was treated at 1300° F. for about an hour while another portion was heat treated at 2000° F., for a similar time. Knife hardness tests on the two portions showed a hardness of 4.0 for the pellets treated at 1300° F. and a knife hardness of 3.5 for those treated at 2000° F.

*Example III*

Example I was again repeated with the exception that in this case approximately twice the amount of collodial silica was employed, the ingredients being mixed in the following proportions:

Alumina-water slurry (45% by weight of solids grams__ 100
Al(NO$_3$)$_3$.9H$_2$O crystals _____do____ 10
Colloidal silica suspension (30% by weight SiO$_2$) cc__ 100

The resulting pellets contained about 14.2% by weight of SiO$_2$. As in the previous examples, portions were separately heat treated at 1300° F. and 2000° F. for approximately one to two hours and knife hardness tests then made. The pellets treated at 1300° F. showed a knife hardness of about 5.7 lbs., while those treated at 2000° F. showed a knife hardness of 8.2 lbs.

*Example IV*

The procedures outlined in the previous examples were repeated except that the ingredients were used in the following proportions:

Alumina-water slurry (45% by weight of solids) grams__ 100
Al(NO$_3$)$_3$.9H$_2$O crystals _____do____ 10
Collodial silica suspension (30% by weight SiO)$_2$ cc__ 3

The resulting pellets contained about 2.4% SiO$_2$ by weight. One portion of the above mixture was extruded as pellets of .086" in diameter and heat treated for one hour at 1300° F., while another portion was extruded as pellets .125" in diameter and heat treated for one hour at 1300° F. The smaller pellets showed a knife hardness test of 3.3 lbs., while the larger pellets showed a knife hardness test of 4.9 lbs.

*Example V*

This example illustrates the difference in results obtained with respect to hardness retention of high temperatures when the same formulation as employed in the previous example is used except for the omission of the collodial silica suspension. In this example the formulation employed was as follows:

Grams
Alumina-water slurry (45% by weight of solids)____ 100
Al(NO$_3$)$_3$.9H$_2$O crystals_____ 10

This mixture was reduced in moisture content to provide a dough suitable for extrusion as in the previous examples and extruded into pellets ⅛" in diameter, dried, treated at 500° F. to decompose the aluminum nitrate into alumina. Portions of the pellets prepared in this matter were heat treated for periods of one hour in a Lindbergh electric oven at the following temperatures: 1300° F., 1400° F., 1600° F., 1800° F., and 2000°F. Knife hardness tests were made on the treated pellets, and the results are shown in the table below:

| Heat treatment temperature, Degrees F.: | Knife hardness (Pounds) |
|---|---|
| 1300 | 3.8 |
| 1400 | 3.4 |
| 1600 | 2.7 |
| 1800 | 0.4 |
| 2000 | 0.0 |

The above table illustrates the drastic effect upon the hardness of the pellets caused by exposure to high temperatures in sharp contrast to the results obtained when pellets are made in accordance with the invention. Pellets made without the colloidal silica in this example when treated at 2000° F. show a knife hardness of zero, that is, they are unable to support the weight of the test knife resting freely upon the pellet.

*Example VI*

This example illustrates the difference in the results with respect to hardness retention at high temperatures when the formulation used in Examples I through IV is employed, except for the omission of the aluminum nitrate. The formulation employed in this example was as follows:

Alumina-water slurry (45% by weight of solids)
grams__ 100
Colloidal silica suspension (30% by weight of $SiO_2$)
cc__ 5

This formulation results in a pellet containing approximately 4% by weight of $SiO_2$. The above formulation was evaporated to form a dough suitable for extrusion, extruded into pellets ⅛" in diameter which were dried slowly to evaporate free moisture. Thereafter portions were heat treated for several hours at the following temperatures: 250° F., 1300° F., 2000° F. Knife hardness tests on these pellets showed the following results:

| Heat treatment temperature, Degrees F.: | Knife hardness (Pounds) |
|---|---|
| 250 | 1.5 |
| 1300 | 1.0 |
| 2000 | 1.0 |

The above example shows the initially low hardness of pellets made without the addition of the decomposable salt such as aluminum nitrate and about a 33% reduction hardness after exposure to high temperatures.

*Example VII*

This example illustrates the effect of soaking a preformed alumina pellet in a coilloidal silica suspension and the results obtained in contrast to those obtained in accordance with the invention. Pellets of activated alumina approximately ⅛" in diameter and ⅛" in length, prepared according to conventional pelletizing procedures, were employed as the starting material. These pellets showed a knife hardness before treatment of about 0.2 pound. Several portions of these pellets were soaked in a colloidal suspension of silica of the type used in previous examples to provide pellets containing various percentages by weight of silica. The various portions were subjected to heat treatment for several hours at temperatures of 1300° F. and 2000° F. respectively and thereafter subjected to knife hardness tests. The results are shown in the table below:

| Percent by weight of $SiO_2$ in pellets | Heat treatment temp., degrees F. | Knife hardness (pounds) |
|---|---|---|
| 2 | 1,300 | 0.7 |
| 2 | 2,000 | 0.8 |
| 4 | 1,300 | 0.9 |
| 4 | 2,000 | 0.7 |
| 6 | 1,300 | 1.4 |
| 6 | 2,000 | 1.4 |
| 8 | 1,300 | 1.6 |
| 8 | 2,000 | 1.9 |

As shown by the above data, the addition of the colloidal silica to the preformed pellets resulted in only a small increase in hardness.

*Example VIII*

This example illustrates the effect of adding both colloidal silica and aluminum nitrate to preformed alumina pellets. The same type of preformed pellets was employed as in Example VII. These pellets were first immersed in a solution of colloidal silica of the same type as used in the previous examples. Commercial "Ludox" containing 30% by weight of $SiO_2$ was first diluted with water in the proportions of 10 cc. of "Ludox" to 55 cc. of water. The pellets after this immersion were drained and dried at 250° F. They were then dipped in a solution of saturated aluminum nitrate, drained and dried again at 250° F. and then heated to approximately 500° F. for the decomposition of the aluminum nitrate. Approximate $SiO_2$ content by weight was 4% in the finished pellets. Two portions of the above pellets were heat treated, one at 1300° F. and the second at 2000° F. Knife hardness tests on the portions showed a knife hardness of 2.4 pounds for the portion treated at 1300° F. and a knife hardness of 0.4 pound for that treated at 2000° F.

To illustrate further the excellent characteristics of a pellet prepared in accordance with the invention in contrast to those prepared by other methods, a series of relatively prolonged attrition tests were made. The attrition test procedure in each case consisted of placing a weighed amount of pellets in a bottle which was then mounted on a vibrator which was operated at a frequency and intensity such as to cause constant agitation of all the pellets in the bottle. At intervals, the bottle was removed from the vibrator, the pellets removed, and the bottle and pellets freed from loose powder. The attritioned pellets were then weighed to determine weight loss due to attrition and replaced in the bottle which was again mounted on the vibrator for further testing. This test was conducted on the following types of pellets:

(1) ⅛" pellets made in accordance with Example IV containing 2.4% $SiO_2$ by weight and heat treated for several hours at 1300° F.

(2) ⅛" pellets the same as in (1) above but heat treated for several hours at 2000° F.

(3) ⅛" pellets made in accordance with Example V and heat treated for several hours at 1300° F.

(4) ⅛" pellets identical to those employed in (3) above except heat treated at 1800° F.

(5) ⅛" pellets of activated alumina prepared by pelletizing of alumina powder according to conventional procedures before any treatment.

(6) ⅛" pellets of activated alumina as in (5) above impregnated with colloidal silica according to the method described in Example VII, to contain 6% by weight of $SiO_2$ in the finished pellets, and thereafter heat treated for several hours at 2000° F.

The results of these attrition tests are graphically shown in the drawing where hours in the attrition test machine are plotted against the weight percent attrition loss. The curves are numbered to correspond with list above. Curves 1 and 2, which show the attrition characteristics of pellets made in accordance with the invention after exposure to temperatures of 1300° F. and 200° F. respectively, indicate less than 0.5% attrition loss after over 300 hours in the test machine. The remaining curves—3, 4, 5 and 6—showing the attrition characteristics of pellets made in accordance with other methods, illustrate the striking results obtained through use of the method of the invention.

Pellets made in accordance with the invention are suited for a great variety of uses, including use at low as well as high temperatures, but are eminently and peculiarly suited for uses involving exposure over long periods to high temperatures, particularly temperatures over 1200° F. which tend to cause drastic softening of pellets made in accordance with other methods. Pellets of activated alumina, beryllia, zirconia, etc., or composites, may be employed as catalytic materials or adsorbents in themselves or may be used as carriers for other materials such as metals and metal oxides with which they may be impregnated. As previously mentioned, they are particularly suited for use as oxidation catalysts when impregnated with metals such as platinum, ruthenium, palladium, nickel, copper, cobalt, chromium or mixtures of these metals. Impregnation with the metal may be effected by any of the known methods in the catalytic art, particularly by impregnation of the activated oxide pellet with a salt of the metal followed by decomposition of the salt to deposit the metal on the pellet in finely divided condition.

Thus, excellent oxidation catalysts may be prepared by impregnating pellets of activated alumina prepared according to the method of the invention with a 1% solution of chloroplatinic acid, followed by drying and then heating to decompose the platinum salt into metallic platinum which is thus deposited upon the alumina pellet in a finely divided condition. Pellets prepared in this manner may by employed at high temperatures, such as 1200° F. to 1800° F. for long periods of time without undergoing appreciable deterioration in their physical or catalytic properties.

It is understood, of course, that pellets prepared according to the invention may be employed for any desired use in addition to those specifically mentioned above such as catalysts or catalyst carriers for carrying out hydrogenation, desulfurization, hydrocarbon reforming reactions, hydrocarbon cracking reactions, etc. It is further understood that the above description and examples are intended to be illustrative and that other modifications within the spirit of the invention are included within the scope of the appended claims.

What is claimed is:

1. A method for the production of catalyst pellets having properties of sustained hardness and attrition resistance at high temperatures comprising the steps of forming a mixture of (a) finely divided inorganic oxide in at least potentially active but non-gelatinous form selected from the group consisting of alumina, beryllia, zirconia, thoria and magnesia, (b) a minor proportion of colloidal silica in an amount of from 0.5% to 20% by weight based on the weight of the end product pellets, and (c) a minor proportion of a metal salt decomposable into the metal oxide selected from said group, said metal salt being in an amount at least sufficient to react with said silica to form a metal silicate binder, shaping said mixture into pellets and thereafter heating the pellets to react the metal salt with the silica to form a metal silicate binder and decompose any excess metal.

2. A method in accordance with claim 1 in which the finely divided inorganic oxide employed in said mixture is in an at least partially activated form.

3. A method in accordance with claim 1 in which colloidal silica is employed in the mixture in such proportion that the resultant pellets contain from 2 to 8 percent silica by weight.

4. A method for the production of catalyst pellets having properties of sustained hardness and attrition resistance at high temperatures comprising the steps of forming a mixture of (a) an inorganic oxide in an at least partially activated form selected from the group consisting of alumina, beryllia, zirconia, thoria and magnesia in such degree of sub-division that the specific surface thereof is of the order of at least 60,000 cm.$^2$/cm.$^3$, (b) an aqueous suspension of a minor proportion of colloidal silica particles in an amount of from 0.5 to 20% by weight based on the weight of the end product pellets and having an average size in the range of from 10 to 150 millimicrons, (c) a minor proportion of a water soluble metal salt decomposable by heat into the metal oxide selected from said group, said metal oxide being present in an amount at least sufficient to react with said silica to form a metal silicate binder; adjusting the moisture content of the mixture to produce a mixture of moldable consistency, molding said mixture into pellets and thereafter heating the pellets to react the metal salt with the silica to form a metal silicate binder and decompose any excess metal salt.

5. A method for the production of catalyst pellets composed chiefly of catalytic alumina and having properties of sustained hardness and attrition resistance at high temperatures comprising the steps of forming a mixture of (a) an at least potentially active but non-gelatinous form of alumina in such degree of sub-division that the specific surface thereof is of the order of at least 60,000 cm.$^2$/cm.$^3$, (b) an aqueous suspension of a minor proportion of colloidal silica in an amount of from 0.5% to 20% by weight based on the weight of the end product pellets, (c) a minor proportion of a water soluble salt of aluminum and a strong acid decomposable into alumina; said salt of aluminum being in an amount at least sufficient to react with said silica to form a metal silicate binder adjusting the moisture content of said mixture to produce a mixture of moldable consistency, shaping said mixture into pellets, and thereafter heating the pellets to react the aluminum salt with the silica to form an aluminum silicate binder and decompose any excess aluminum salt.

6. A method in accordance with claim 5 in which colloidal silica is employed in the mixture in such proportion that the weight percentage of silica in the finished pellets is from 2 to 8 percent.

7. A molded catalyst pellet having properties of sustained hardness and resistance to attrition at high temperatures produced according to the method of claim 1.

8. A molded catalyst pellet having properties of sustained hardness and resistance to attrition at high temperatures produced according to method of claim 5.

References Cited in the file of this patent

UNITED STATES PATENTS

| | | |
|---|---|---|
| 2,342,196 | Hendrix et al. | Feb. 22, 1944 |
| 2,595,056 | Connolly | Apr. 29, 1952 |
| 2,941,958 | Connor et al. | June 21, 1960 |